United States Patent [19]

Atkinson et al.

[11] Patent Number: 4,897,802

[45] Date of Patent: Jan. 30, 1990

[54] METHOD AND APPARATUS FOR PREPARING AND DISPLAYING VISUAL DISPLAYS

[75] Inventors: William B. Atkinson, Yorba Linda; William R. Bronaugh, Garden Grove, both of Calif.

[73] Assignees: John Hassmann, Laguna Hills; Vern Schooley, Long Beach, both of Calif. ; part interest to each

[21] Appl. No.: 932,364

[22] Filed: Nov. 19, 1986

[51] Int. Cl.[4] .............................................. G06K 15/00

[52] U.S. Cl. ........................................ 364/518; 40/362

[58] Field of Search ............... 364/518, 520; 40/152.2, 40/361, 367, 615, 362; 430/6, 22, 5, 30, 394

[56] References Cited

U.S. PATENT DOCUMENTS

| | | | |
|---|---|---|---|
| 606,915 | 8/1898 | Sibley . | |
| 829,902 | 8/1906 | Urry | 40/437 |
| 1,172,360 | 2/1916 | Hildburgh . | |
| 1,172,455 | 2/1916 | Hildburgh . | |
| 1,322,542 | 11/1919 | Chauvet . | |
| 1,594,703 | 8/1926 | Ballerini . | |
| 1,869,276 | 7/1932 | Precourt | 40/502 |
| 1,888,527 | 11/1932 | Edouart | 352/97 |
| 1,938,899 | 12/1933 | Gilman | 178/33 |
| 2,149,779 | 3/1939 | Kroner | 40/615 |
| 2,151,055 | 5/1938 | Stark | 40/615 |
| 2,163,188 | 6/1939 | Bosch | 40/28 |
| 2,246,001 | 6/1941 | Powers | 88/61 |
| 2,263,281 | 11/1941 | Von Tadden | 40/28 |
| 2,293,106 | 8/1942 | Bourdakoff | 40/133 |
| 2,506,135 | 5/1950 | Burchell | 88/65 |
| 2,605,965 | 8/1952 | Shepherd | 235/61.6 |
| 2,618,087 | 11/1952 | Hutchinson, Jr. | 40/32 |
| 2,645,047 | 7/1953 | O'Gorman | 40/32 |
| 2,689,422 | 9/1954 | Hoff | 40/133 |
| 2,956,359 | 10/1960 | Smith et al. | 40/132 |
| 2,982,038 | 5/1961 | Kass | 40/53 |
| 2,989,680 | 6/1961 | Weiser et al. | 318/467 |
| 3,000,125 | 2/1961 | Elvestrom | 40/137 |
| 3,014,302 | 12/1961 | Hughes | 40/615 |
| 3,054,203 | 9/1962 | French | 40/28 |
| 3,082,560 | 3/1963 | Elvestrom | 40/137 |

(List continued on next page.)

OTHER PUBLICATIONS

Rosenfeld et al., ("Digital Picture Processing"), pp. 153–202, Academic Press, 1976.

*Primary Examiner*—Gary V. Harkcom
*Assistant Examiner*—Phu K. Nguyen
*Attorney, Agent, or Firm*—Fulwider, Patton, Rieber, Lee & Utecht

[57] ABSTRACT

A display system having a single-frame transparency which contains four independent images, each of the images having spaced apart groups of pixels interlaced with the groups of pixels from each of the other images, each of the images being selectable for projection by a movable grid mask, is provided. A method for preparing and displaying four images from a single-frame transparency is also disclosed. The single-free transparency having interlaced groups of pixels from four individual images is formed from four individual transparencies having a copy pattern formed thereon, the copy pattern being divided into spaced apart square shaped groups of pixels defining a matrix of translucent optic segments. The mosaic transparency is mounted in a back lighted box and then overlaid with a grid mask having a plurality of grid apertures in registered alignment with the optic segments representing one of the images and the grid lines of the grid mask blocking projection of light through the other optic segments from each of the other images. The grid mask is then sequentially displaced in a square pattern to sequentially register the grid apertures with the optic segments of each of the other images, and thereby sequentially displaying each of the four images provided on the single-frame transparency.

10 Claims, 6 Drawing Sheets

OTHER PUBLICATIONS

| | | | |
|---|---|---|---|
| 3,086,306 | 4/1963 | Morgan | 40/52 |
| 3,110,893 | 11/1963 | Peacock | 340/336 |
| 3,314,179 | 4/1967 | Leach | 40/137 |
| 3,421,805 | 1/1969 | Rowland | 350/6 |
| 3,480,352 | 11/1969 | Denison | 352/81 |
| 3,562,941 | 2/1971 | Boden | 40/106 |
| 3,572,925 | 3/1971 | Ables et al. | 364/520 |
| 3,683,525 | 8/1972 | Fukui | 353/30 |
| 3,742,631 | 7/1973 | Hasala | 40/36 |
| 3,747,243 | 7/1973 | Schneider | 40/133 |
| 3,862,504 | 1/1975 | Ringelheim, deceased | 40/106 |
| 3,902,901 | 9/1975 | Vogel | 96/30 |
| 3,918,185 | 11/1975 | Hasala | 40/137 |
| 3,953,764 | 4/1976 | Miller et al. | 315/386 |
| 3,961,434 | 6/1976 | Sampon | 40/106.53 |
| 4,050,809 | 9/1977 | Boggs | 353/35 |
| 4,118,879 | 10/1978 | Simon | 40/106 |
| 4,267,489 | 5/1981 | Morohashi | 40/361 |
| 4,491,434 | 1/1985 | Barr et al. | 40/362 |
| 4,508,802 | 4/1985 | Heiart et al. | 430/22 |
| 4,542,376 | 9/1985 | Bass et al. | 340/724 |
| 4,616,327 | 10/1986 | Rosewarne et al. | 364/518 |
| 4,620,288 | 10/1986 | Welmers | 364/518 |
| 4,637,974 | 1/1987 | Kubit | 430/126 |

METHOD AND APPARATUS FOR PREPARING AND DISPLAYING VISUAL DISPLAYS

BACKGROUND OF THE INVENTION

1. Field of the Invention

The present invention relates to advertising and more particularly to a method and apparatus for sequentially displaying multiple copies in a single display.

2. Description of the Prior Art

With the advent of modern display advertising, limitations on advertising budgets and limited locations for display to high densities of consumers, a great demand has arisen for the capability of preparing multiple advertisements and the displaying the multiple advertisements in timed sequences at popular display locations thus enabling a number of advertisers to benefit from a single location. Numerous different methods and devices have been proposed for preparing and displaying such advertisements. Many such devices involve relatively unwieldy mechanical elements driven by complex mechanical drive mechanisms which require a certain degree of mechanical precision thus adding to the expense of original manufacture and resulting in prohibitively expensive maintenance. Others require expensive procedures to treat the advertising copy for display thus adding to the overall cost.

There exists also a need for a system for displaying multiple copies wherein the exchange from one display to another is nearly instantaneous to thus enable the sequential display of different copies which may give the impression of animation to thereby draw and hold the viewer's attention to what appears to be an animated advertisements.

Numerous different prior art display devices have endeavored to utilize patterns of back lighted apertures selectively unmasked to display predetermined patterns of illumination defining different numbers, letters or figures. These devices, however, generally fail to afford the benefit of receiving and displaying multiple copies of display advertising in an efficient and convenient manner.

It is an object of the present invention to provide a method of creating a computer copy film or transparency for sequentially displaying displays of discrete copies. The transparency is made up of a mosaic of discrete patterns formed by relatively small interlaced translucent window segments arranged in uniform groups, with the window element of each group occupying the same relative position in each group and bearing a coloration corresponding with the coloration of the corresponding area of one of the discrete copies. The transparency may thus be backlighted and an opaque screen having a corresponding uniform pattern of display apertures aligned with the corresponding window element of each group. The screen may then be selectively shifted laterally distances corresponding with the widths of such window elements to selectively block out all but a single discrete pattern to sequentially display each such discrete pattern.

SUMMARY OF THE INVENTION

The present invention is directed to a display system having a single-frame transparency which contains four independent images, each of the images having spaced apart groups of pixels interlaced with groups of pixels of each of the other images, each of the images being selectable for projection by a movable grid mask. The invention is further characterized by the preparation of a mosaic transparency of a uniform pattern of uniformly sized pixels defining window elements, such window elements being arranged in uniform groups, each group having respective window elements in corresponding locations therein. The window elements in corresponding locations in each group cooperate to define discrete patterns for video display. A screen formed with an opaque grid is provided to overlie such transparency and is formed with apertures which, when the screen is in a predetermined position, register over all window elements corresponding with one such discrete pattern. Consequently, shifting of such transparency through a predetermined sequence relative to such screen will serve to selectively screen out, except for the pattern being displayed, all light being projected through such transparency to thus provide for sequential display of the individual discrete patterns.

The display apparatus of the present invention includes a frame for mounting on a backlighted display box and formed with a mount for mounting such transparency and a second frame for mounting the screen. A drive is provided for selectively driving the transparency frame through a predetermined sequence relative to the screen frame to selectively register the grid apertures simultaneously with the correspondingly located window elements of each group.

Other objects and features of the invention will become apparent from consideration of the following description taken in connection with the accompanying drawing.

DETAILED DESCRIPTION OF THE PREFERRED EMBODIMENT

Figure 1:
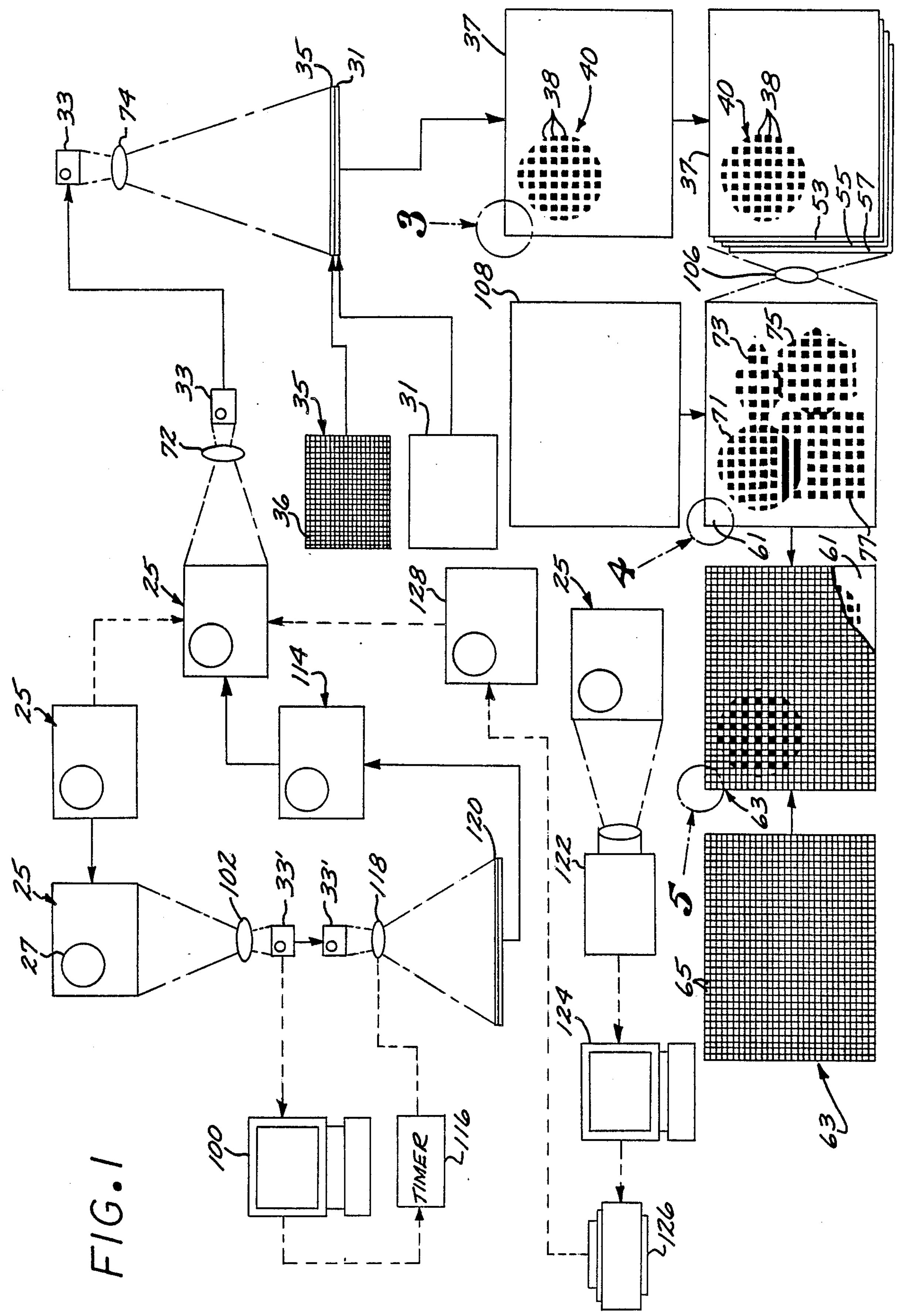
FIG. 1 is a diagrammatic view of one embodiment of the method of the present invention.
Figure 2:
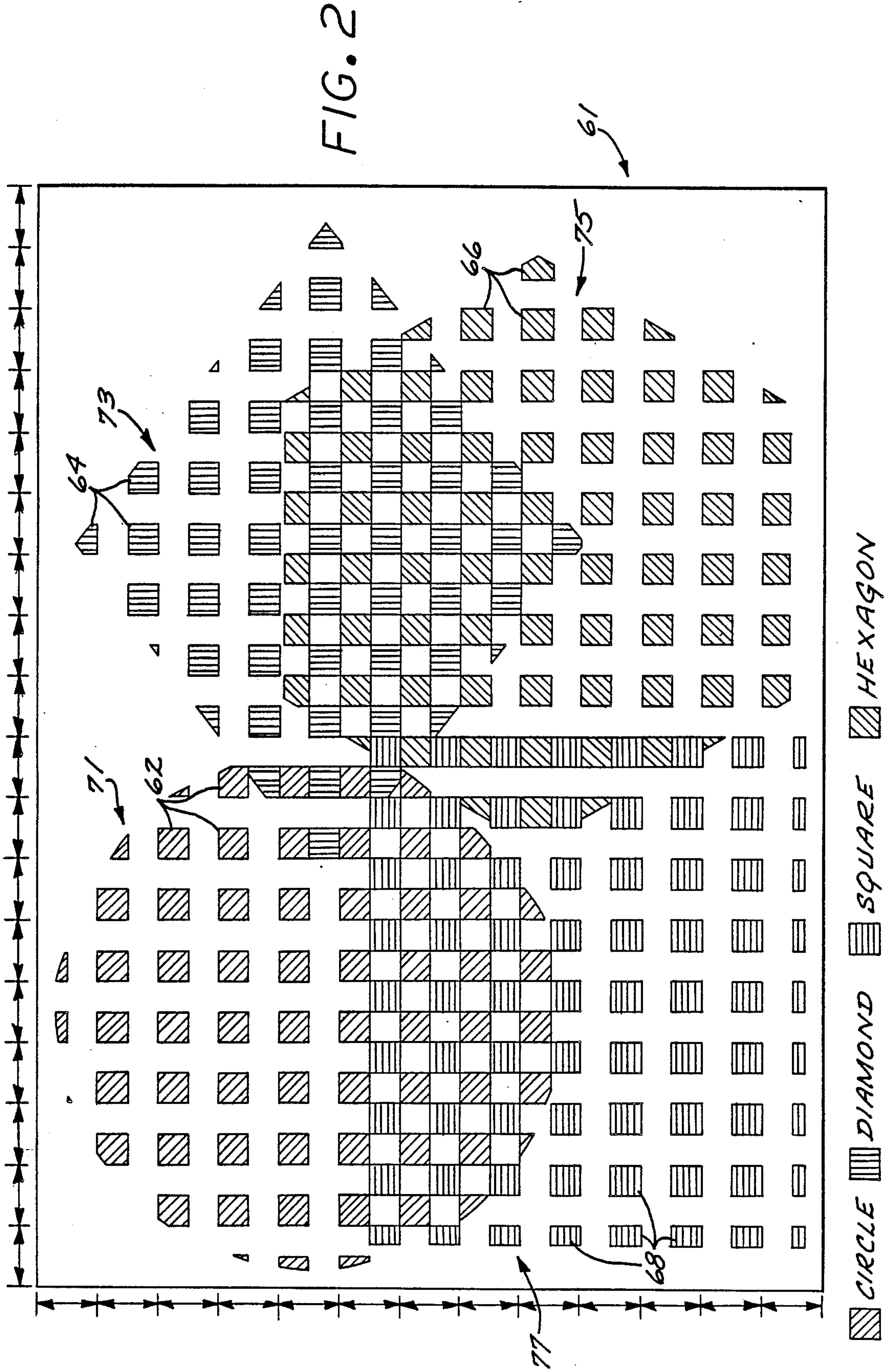
FIG. 2 is a diagrammatic view of a mosaic transparency which may be utilized in the method of the present invention.
Figure 5:
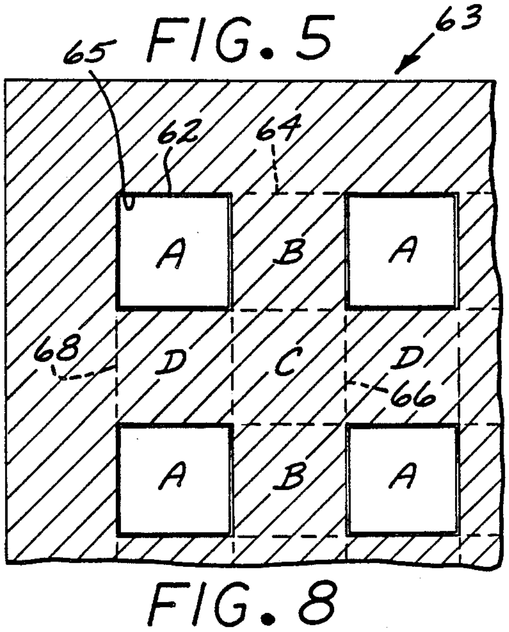
FIGS. 5-8 are diagrammatic views in enlarged scale taken from the circle designated 4 in FIG. 1 and depicting a display screen in four different positions located in a one position.

Referring to FIG. 1, the present invention includes the selection of copies represented herein by the copy 25 of, for instance, advertising having different patterns such as a circle 27, thereon and photographing such copy onto a film to define a negative 33 thereof. For the purpose of illustration, a transparent full size photographic film 31 is depicted as being covered by a screen 35 having an opaque gridwork thereon defining a predetermined pattern of uniform apertures 36 located uniformly thereabout to block out approximately 75% of light projected therethrough. An image of the negative 33 is projected on the film 31 to produce a transparency 37 having optic segments 38 thereon corresponding in location and size with the apertures 36 of the mask 35 and cooperating to define a discrete pattern, generally designated 40, depicted herein as a circle. This process is repeated for three other copies similar to the copy 25 to form three additional optic transparencies 53, 55 and 57 (FIG. 1). The four transparencies are then stacked together with their respective optic segments, offset from one another to cooperate together in forming a mosaic of four discrete optic patterns corresponding with the four original copies. The stacked together transparencies 37, 53, 55 and 57 are then photographically reproduced to produce a mosaic transparency, generally designated 61, made up of interlaced translucent window segments 62, 64, 66 and 68 (FIG. 2). A display screen, generally designated 63 (FIG. 5) formed with a gridwork defining apertures 65 therein, corresponding in size and location with the apertures 36 in the copy screen 35, may be placed over the mosaic transparency 61 and shifted thereabout to simultaneously register such apertures with all window segments 62 forming the circle pattern 40 to thus project that pattern. The mask is then shifted to continuously register apertures with all window segments 64, 66 and 68 corresponding with the individual pattern reproduced from the remaining transparencies 53, 55 and 57.

The method of the present invention may be carried out by any generally acceptable reproduction process, such as photography or computer reproduction. For the preferred embodiment, it is proposed that, for black and white work or for copying work which doesn't require color correction, the original advertising copy 25 be first photographed to produce the negative 33. For color work requiring color enhancement, the coloration may be corrected as discussed hereafter.

For clarity, the pattern of the respective copy and display apertures 36 and 65 discussed herein are shown in the drawings as being constructed in an imaginery grid-like arrangement with lines drawn therebetween to define individual square cells corresponding in size with the respective apertures 36 and 65. For ease of explanation, I refer to these cells as pixels and the square pattern defined by four such pixels as groups or groups of pixels. Consequently, a group is made up of four contiguous separate pixels, the upper left pixel of each group for the masks 35 and 63 forming the respective apertures 36 and 65.

FIG. 2 is a diagrammatic view of an interlaced pattern of groups of pixels defining window elements 62, 64, 66 and 68 which cooperate together in defining discrete designs of a circle, diamond, hexagon and square, generally designated 71, 73, 75 and 77, respectively, corresponding with the respective individual patterns in the screens 37, 53, 55 and 57. The dimension of the square patterns defining the cells which make up the pixels will vary according to the distance from which the mosaic transparency 61 is to be viewed. The present invention takes advantage of the fact that when light is projected through a grid work of apertures formed by lines equal in width to the apertures, the human eye perceives the apertures as being wider than the lines separating them. This stems from the fact that light from a source located closely behind the screen defining such apertures radiates outwardly through the apertures in a divergent fashion thus projecting divergently toward the viewer and tending to obscure the lines formed between such apertures.

It will be appreciated by those skilled in the art that, while the shape and pattern of pixels defining the groups may take on other variations, the most efficient arrangement is a square pattern configured to define cells cooperating together to form square pixels. For instance, the pixels may take the form in the mosaic transparency of a pattern of uniform parallel bars defining window elements bearing alternate optic segments of two discrete patterns. Such an arrangement would, however, be limited to displaying just two such patterns, rather than four.

In the preferred embodiment the pixels and, consequently, the window elements are arranged such that the display screen may be registered with one set of window elements to display the corresponding pattern and then shifted in one direction a distance equivalent to the width of a cell to display a second pattern, then laterally a like distance to display a third pattern, then back in the direction opposite such first distance to display a fourth pattern and then finally back to the first position to start the sequence over.

In the preferred embodiment, the mosaic transparency 61 is intended to display four discrete displays at the point of purchase such that supermarket shoppers and the like may view the displays from the aisles of a supermarket. For such applications, it has been discovered that the dimension of 0.013 inches for the sides of the pixels and, accordingly, respective copy and display apertures 36 and 65 presents a display, which is perceived by the human eye from a distance of about ten feet or more as a field faithfully representative of the respective patterns 71, 73, 75 and 77.

For the purpose of illustrating the preferred embodiment, it is assumed that a first negative 33 is to be prepared of a copy 25 depicting a circle 27, a second negative of a copy (not shown) depicting a triangle to be reproduced as the triangle 73 (FIG. 2), a third copy (not shown) depicting a square corresponding with the square 75 and a fourth copy depicting a hexagon corresponding with the hexagon 77. Since the steps for preparing the transparencies 53, 55 and 57 are identical to that for preparing the transparency 37 only those for preparing transparency 37 are described.

The screen copy 35 may be constructed from a fiber-optically produced, high resolution screening grid available from Bychrome Co., Box 1077, Columbus, Ohio 43216. The screen 35, while being thought of as apertures in an opaque field, is actually a lined transparent film with the space between the lines forming the apertures or pixels. It has been found advantageous to form the square pixels defining the optic segments 38 of each of the transparencies slightly undersized such that when they are stacked and registered with one another as shown in the lower right hand corner of FIG. 1, thin transparent lines on the order of 0.004 inches are formed at the borders thereof. This is because when the transparencies 37, 53, 55 and 57 are stacked as shown in the lower right hand corner of FIG. 1, each having a thickness of about 0.004 inches, exhibit a combined thickness of about 0.016 inches. As a result the divergent light projected therethrough to develop the mosaic transparency 61 will diverge slightly as it passes from layer to layer. As a consequence, if the optic segments 38 of the combined discrete pattern of all transparencies 37, 53, 55 and 57 were full size to dispose the edges thereof in direct vertical alignment over one another as viewed from the top of the stack of transparencies the light projected therethrough during development would create shadows and consequent dark lines at the borders of the window segments 62, 64, 66 and 68 of the mosaic transparency 61. This is because light projected divergently through from the top of the stacks 37, 53, 55 and 57 would diverge outwardly past the edges of the optic segment 38 of, for instance, the top transparency 37, to project an image thereof on the underlying contact film larger than the optic segment resulting in some overlap at the marginal edges of the optic windows 62, 64, 66 and 68.

By forming the optic segments 28 slightly smaller than the window elements 62, 64, 66 and 68 and display screen apertures, the slightly enlarged images of the optic segments 38 of the respective transparencies 37, 53, 55 and 57, as projected on to the film which forms the mosaic transparency 61, is just sufficient to dispose their edges contiguous to one another thus entirely occupying the transparency 61 without overlap. It is appreciated that the degree of divergence of the developing light will vary from the center to the sides of the stacks 37, 53, 55 and 57, across the face thereof and that such variation is somewhat compensated for by the fact that there is a variation in the degree of divergence of the developing light projected across the face of the individual films 31 as they are developed into the transparencies. For the present embodiment a copy screen 35 available from Bychrome Co. having thirty-eight lines per inch and a line weight to obscure 80% of the underlying transparency has proven successful for use with a display screen 61 also having thirty-eight lines per inch and a line weight producing 75% obscurity.

It will be appreciated that while, for clarity, the screens 35 and 63 are depicted in the drawings as merely graph lines, in actual practice they are made up of vertical and horizontal opaque lines spaced apart a distance equal to their width. Thus they could be thought of as opaque horizontal and vertical alternating opaque bars which cooperate to form the square apertures having a dimension on each side equal to the width of the bars or lines.

Since the pixels are of generally the same size to define the apertures in the copy screen 35 and display screen 61 of substantially the same size, for the purpose of this description, unless stated otherwise, they will be treated as of substantially equal size, the only variation from the exact same size being to compensate for the divergent developing light as projected through the stacks 37, 53, 55 and 57 as described above.

By way of example, the size of the pixels may be substantially 0.013 inches square to combine together in repetitive patterns of four having a dimension on each side of 0.026 inches.

The artwork in the advertising copy 25 may be prepared in a conventional manner. As noted above, for copy not requiring color correction, the artwork is first photographed, as for instance by a conventional camera 72, onto a commercially available 35 mm negative film to form the negative 33. The negative is then placed in a photographic enlarger 74. A full sized transparency film 31 is then placed in the vacuum frame of the enlarger 74 and the copy screen 35 placed thereover.

The masked transparency 3 is then exposed to light from the image on the negative 33 to produce the transparency 37 which is generally transparent but has the discrete circular pattern 40 thereon corresponding with the original pattern 27 but, made up of square translucent dots defining the optic segments 38 which correspond in size and location with the aforementioned pattern of pixels. Such optic segments 38 (FIG. 3) are spaced uniformly about the area of the transparency 37 and cooperate together to form 25% of the overall transparency area, the remainder being transparent to form, between such segments, a gridwork defining transparent optical apertures.

The aforementioned steps are then repeated for the second, third and fourth copies to produce the transparencies 53, 55 and 57 bearing respective patterns of translucent optical dot-like square optic segments (not shown) arranged in a pattern dictated by the apertures in the copy screen 35. The transparencies 37, 53, 55 and 57 are then arranged in stacked relationship with the optic segments, corresponding to the segments 38, of each transparency offset from the optic segments of each other transparency. It will be appreciated that since the optic segments for each transparency occupy 25% of the overall area, with the four transparencies married together and the optic segments of each transparency offset from the segments of the other transparency, the entire area of the combined transparencies, except for the fine transparent lines defined between such segments as discussed hereinabove, will be occupied by such optic segments. The composite of all such segments, as viewed from the front of the stack of screens, forms a mosaic of interlaced optic segments which may then be developed to construct a mosaic transparency 61.

Figure 3:
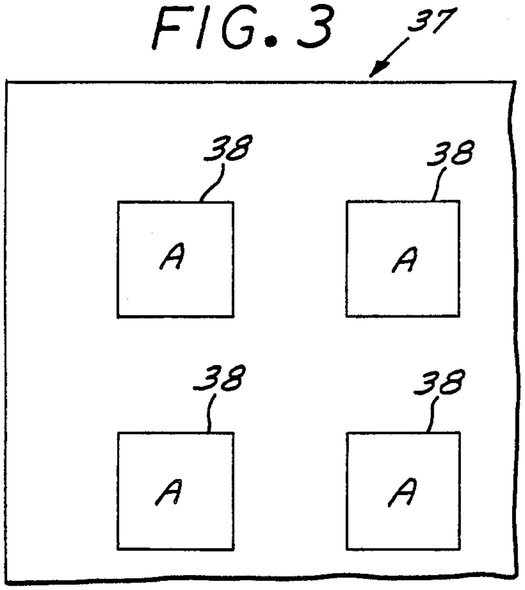
FIG. 3 is a diagrammatic view, in enlarged scale, taken from the circle designated 3 in FIG. 1.
Figure 4:
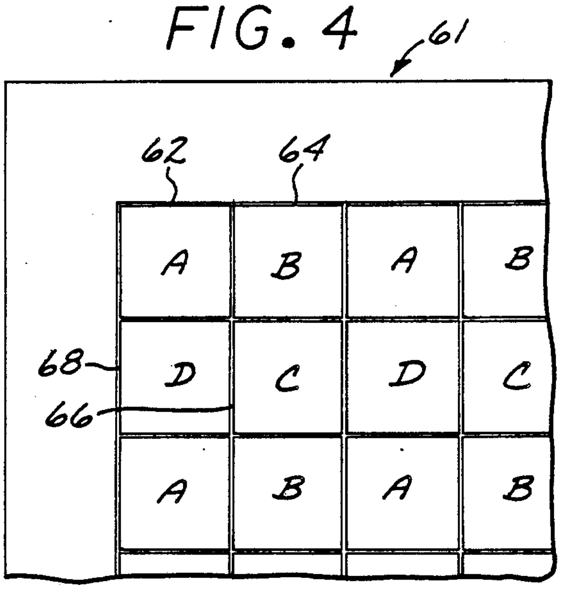
FIG. 4 is a diagrammatic view, in enlarged scale, taken from the circle designated 4 in FIG. 1.

With continued reference to FIG. 1, the stack of individual transparencies 37, 53, 55 and 57 are then exposed to a photosensitive film 108, as by mounting back in the enlarger 74 or in a separate developer 106 to form the mosaic transparency 61 (FIGS. 1, 3 and 4).

It is important that each window segment 62 (bearing the designation "A" in FIG. 4) forming the circle pattern 71 has the correspondingly same location relative to the other window segments 64, 66 and 68 forming the diamond, hexagon and square patterns 77. It is also important for the preferred embodiment that such window segments 62, 64, 66 and 68 be arranged in a pattern such that segment 64 is contiguous to segment 62, segment 66 contiguous to segment 64 and segment 68 contiguous to segment 66 and 62. In this manner, as described hereinafter, the respective pattern formed by the composite array of segments 62 may first be displayed, then those formed by the segments 64, then those formed by the segments 66 and finally those formed by the segments 68, and the loop then repeated.

The display screen 63 (FIGS. 1 and 5) may be fabricated in a manner similar to the mask 35 such that, when the mask is in one position, the apertures 65 are formed in alignment with the corresponding window segments 62 of each group formed by the four juxtaposed pixels defining the window elements 62, 64, 66 and 68. Thus, by initially positioning the mosaic transparency 61 relative to the screen 63 to register the apertures 65 with all segments 62 and projecting light through the master screen 61 an image of the original circular copy pattern 27 will be projected. When viewed from a distance of about 10 feet or more, the image produced will appear to the human eye as a field faithfully reproducing the original copy.

Figure 6:
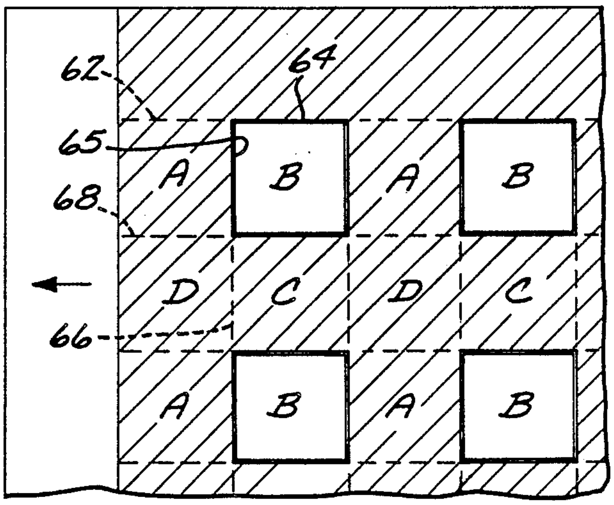
Figure 8:
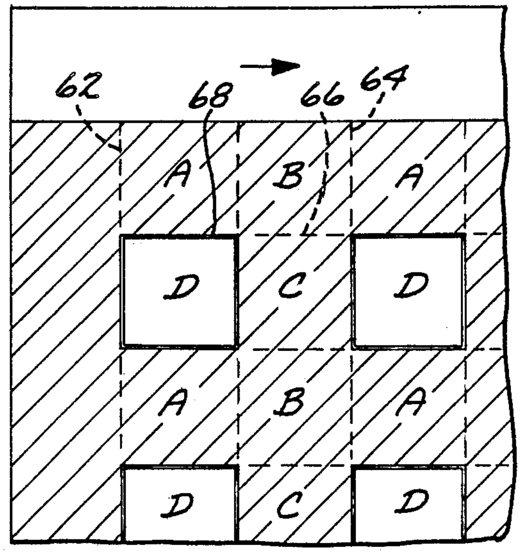

FIGS. 2 and 3, 4–7 diagrammatically depict this technique. FIG. 4 diagrammatically depicts the square window elements 62, 64, 66 and 68 designated "A", "B", "C" and "D", respectively, and cooperating together in respective square patterns of four square pixels. With the display screen 63 in position to register the aperatures 65 with the window segments 62 corresponding with the circular copy pattern 27, all other segments 64, 66 and 68 associated with the remaining copy will be blanked out (FIG. 5), thus projecting only the configuration of the circular pattern 71. By shifting the transparency 61 directly to the left 0.013 inches relative to the screen 63 to register the window segments 64 defining the diamond pattern 73 ("B") with the apertures 65 as shown in FIG. 6, all remaining window segments not associated with the second copy will be masked out, thus causing light projected through the segments 64 to cooperate in forming the diamond pattern 73 (FIG. 2).

Figure 7:
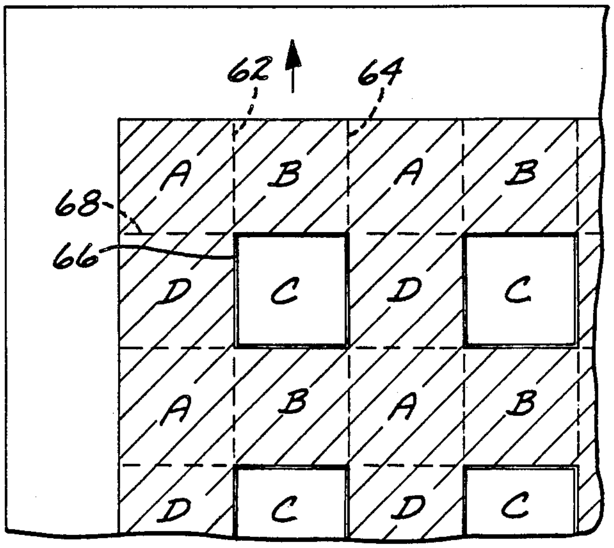

By then shifting the screen up 0.013 inches relative to the screen 63, the apertures 65 will register with the window segments 66 ("C") as shown in FIG. 7 to project the hexagon pattern associated with the third copy. By then shifting the display screen 61 0.013 inches to the right the apertures 65 will register with the window segments 68 thus projecting the square pattern 75 as depicted in FIG. 2. Then, by shifting the mask down the entire procedure may be repeated.

It is noted in FIG. 2 that at the central intersection of all four patterns 71, 73, 75 and 77, all pixels defining the window segments are shown diagrammatically as being interlaced with one another to form a composite mosaic. The grid on the screen 63, when properly registered, serves to block out the light from all but one pattern of the interlaced window elements.

The above-described method has proven to work well for black and white copy or colored copy which is of such bright colors that the step of screening out approximately 75% thereof by the gridwork of the screen 35 will not significantly effect the quality of color appearing in the individual transparencies 37, 53, 55 and 57 and mosaic transparency 61.

For color applications where the color tone in the copy is such that color correction or enhancement is required, conventionally available computer enhancing systems 100 (FIG. 1) may be utilized. Such computer systems are well known in the industry and are characterized by the capability of storing reference color information, reading colored images, digitizing and storing information on the characteristics of the images read, comparing the color read with the stored information and producing a code indicative of the exposure time required for photographing of the image to produce a print having sufficient color enchancement to compensate for any light absorbed by the copy screen 35.

Figure 17:
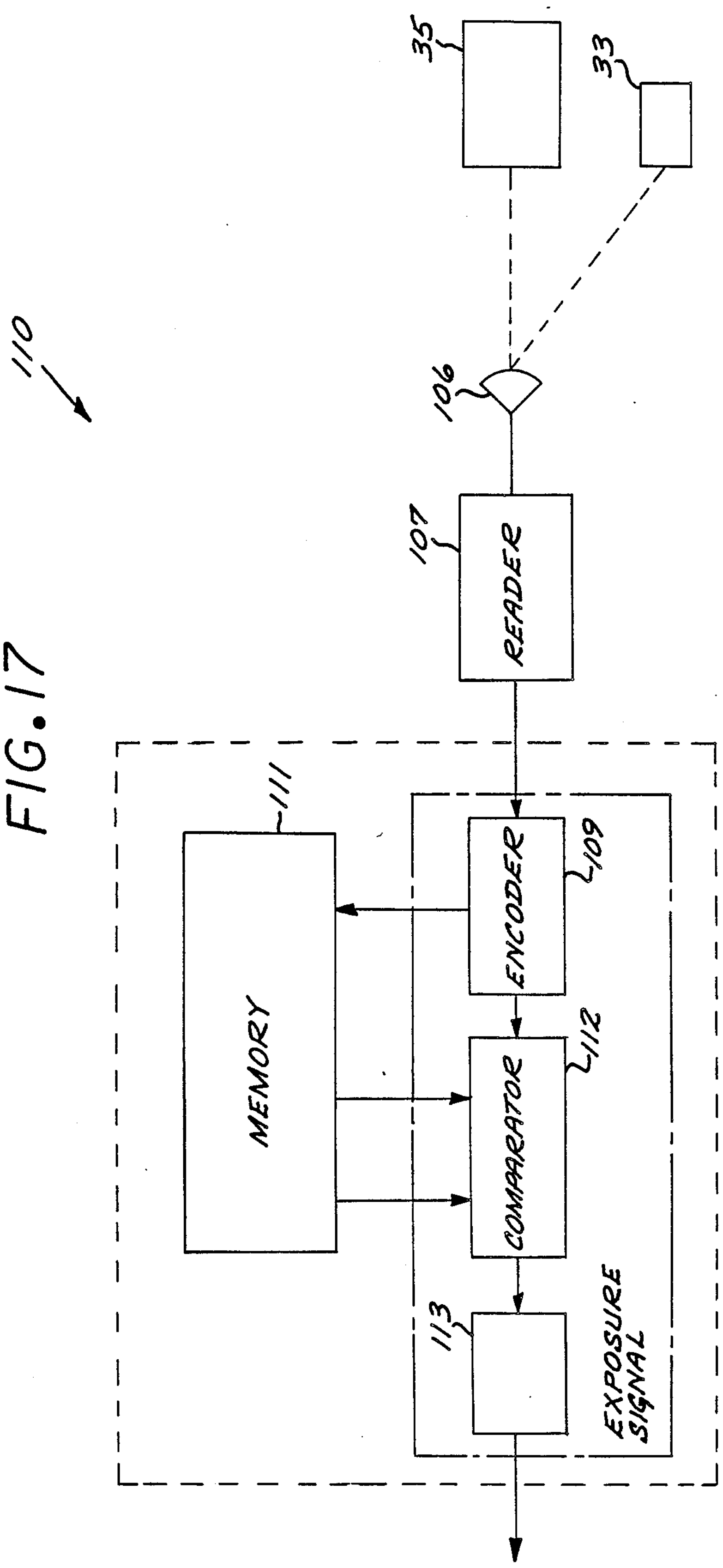
FIG. 17 is a schematic view of a computer and optic reading system which may be used in the method depicted in FIG. 1.

Referring to FIG. 1, assuming the copy 25 is in color requiring color enhancement, the negative 33' may be fed into and optical reader and computer 100. The computer and optic reader 110 (FIG. 17) includes a conventional optic camera 106 for scanning the copy screen 35. The scanner is connected through a reader 107 to an encoder 107 which digitizes the information relating to the density of the lines in the screen 35 forming the apertures 36. The reader 109 is connected with the computer memory 111 to store the resultant information. The optic reader 106 will also scan the negative 33 to generate a signal for storage in the memory 111 characteristic of the coloration therein. The computer 110 includes a comparator 112 connected with the memory 110 and operative to retrieve the stored information relating to the screen 35 for comparison to the coloration signal generated by reading the negative 33 to compare such signals and generate a corresponding exposure signal in a generator 113 for transmission to a timer 116. The timer 116 is connected with an enlarging camera 118 to control the exposure thereof.

The image of the negative 33 is projected through the enlarging camera 118 and on to a photosensitive film 120 to obtain the degree of enhancement indicated by the quality of color in the original negative 33. The developed film then becomes a print 114 having an enhanced color pattern thereon which is then substituted for the original artwork 25 to be photographed by the camera 72. The process is then repeated for each of the remaining three copies and the process repeated as described hereinabove to produce the transparencies 37, 53, 55 and 57.

It will be appreciated that such color enhancement may be achieved by other means, as for instance a video camera 122 and computer 124 as shown in lower left-hand portion of FIG. 1. The video camera 122 is operative to scan the original artwork 25 and generate a color indication signal indicative of the quality of color therein. That signal is then compared with a signal stored in the memory of the computer 124 corresponding with the characteristics of the copy screen 35 to thus generate a printer signal corresponding with the magnitude of color correction required to produce the desired coloration of the original artwork 25 when screened by the screen 35. The printing signal is then fed into a jet ink printer 126 which prints out a color corrected copy 128 which may then be substituted for the original artwork 25 to be photographed by the camera 72.

Figure 16:
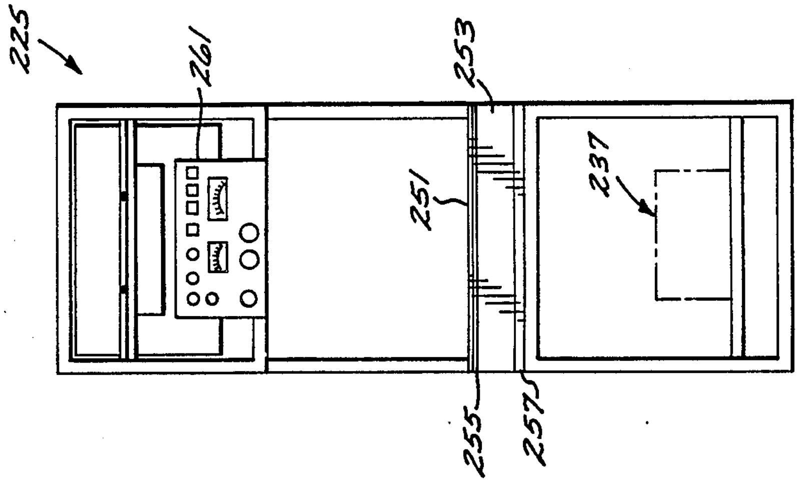
FIG. 16 is a front elevational view of the camera shown in FIG. 14.
Figure 14:
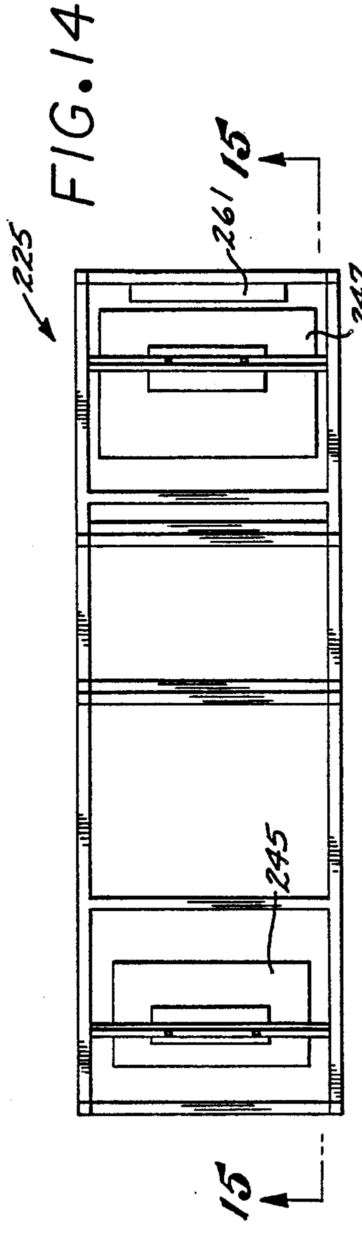
FIG. 14 is a top plan view of a camera which may be employed in the method depicted in FIG. 1.
Figure 15:
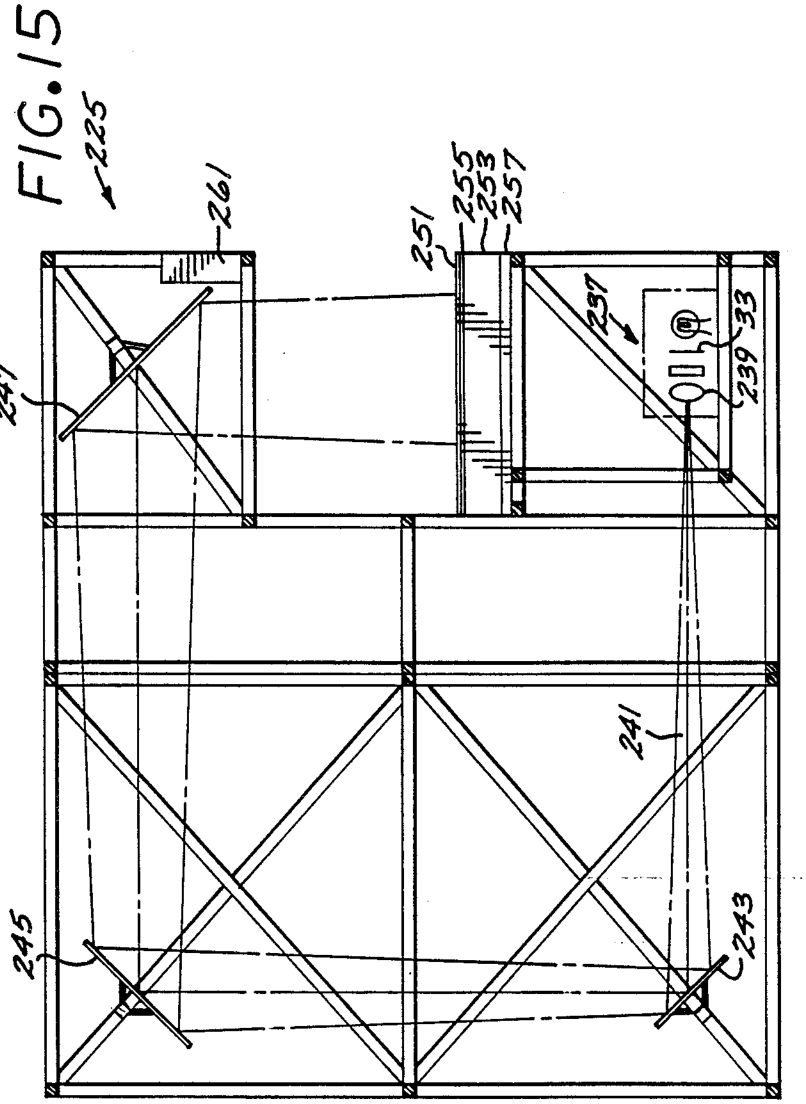
FIG. 15 is a vertical sectional view taken along the line 15—15 of FIG. 14.

An alternative technique for producing the mosaic transparency 61 is a camera, generally designated 225, shown in FIGS. 14–16. The camera 225 includes a framework mounting a projector, generally designated 237, for projecting light from a negative 33 through a lens 239 along a folded light path 241. The folded light path is formed by first, second and third 45° mirrors 243, 245 and 247, respectively. Fixedly mounted at the film plane is a copy screen 251 similar to the copy screen 35. Mounted behind the copy screen 251 is a movable vacuum mount 253 which releasably mounts a photosensitive film 255. The vacuum plate 253 is mounted from a drive mechanism 257 similar to the index pins 173 and drive motor 181 and eccentric drive gear 201 shown in FIG. 12 and described hereinafter such that the photographic film 255 may be shifted 0.013 inches right, left and up and down. Mounted at the front of the camera 237 is a control panel 261 for controlling operation thereof.

It will be appreciated by those skilled in the art that the camera 225 will be operated in a dark room, or at least extremely subdued light to avoid premature exposure of the photosensitive film 255.

To fabricate a mosaic transparency 61 by the camera 225, a first negative 33 is mounted in the projector and the light therefrom projected through the apertures in the copy screen 251 to form optic segments 38 shown in FIG. 1 on the film 225, thus created a discrete pattern of square dots corresponding to the image of the negative 33. A second negative corresponding with the second copy is then placed in the projector and the drive mechanism 257 actuated to shift the film 255 sideways 0.013 inches. The projector is then actuated to burn an image of the copy on the second negative through the apertures of the screen 251 and onto the film 255 to thus create a discrete pattern of dots corresponding with the image of the second copy. This is then repeated for the third and fourth negatives, the film 255 being shifted upwardly and then sideways for those negatives.

In addition to the advantage of employing only a single photographic film 255, the camera 225, having an extended light path of about 20 feet, projects light through the apertures of the screen 251 and into the film 255 in relatively columnated fashion to thus maintain the size of the optic segments defined by the light projected through the apertures of the screen 251 more nearly the same size as that of the apertures. This reduces the problems attendant highly divergent light rays passing through the apertures of the screen 251 which would, of course, pass also divergently through the photosensitive film 255 thus forming somewhat frusto pyramidal shaped optic segments projecting through the thickness of the transparent film 255. Once the four discrete patterns of optic segments have been formed in juxtaposed relationship in the film 255, the developed film may then act as a mosaic transparency 61.

A particularly useful mechanism for mounting and displaying the mosaic transparency 61 of the present invention is shown in FIGS. 9 through 13. A housing, generally designated 123 forms a relatively flat rectangular exterior framework shaped generally like a picture frame and having a thickness on the order of ¾ of an inch. Mounted within the confines of the rectangular housing frame 123 is a smaller rectangular transparency mounting frame 125. The housing frame 121 is constructed of extruded aluminum members formed in cross sections, each with a hollow body member 127 (FIG. 13) having formed on the interior periphery thereof an inwardly opening groove 129 which mounts a self lubricating plastic liner 131. Received in sliding relationship within such liner 131 is a peripheral tongue 133 formed about the periphery of the transparency frame 125.

Figure 13:
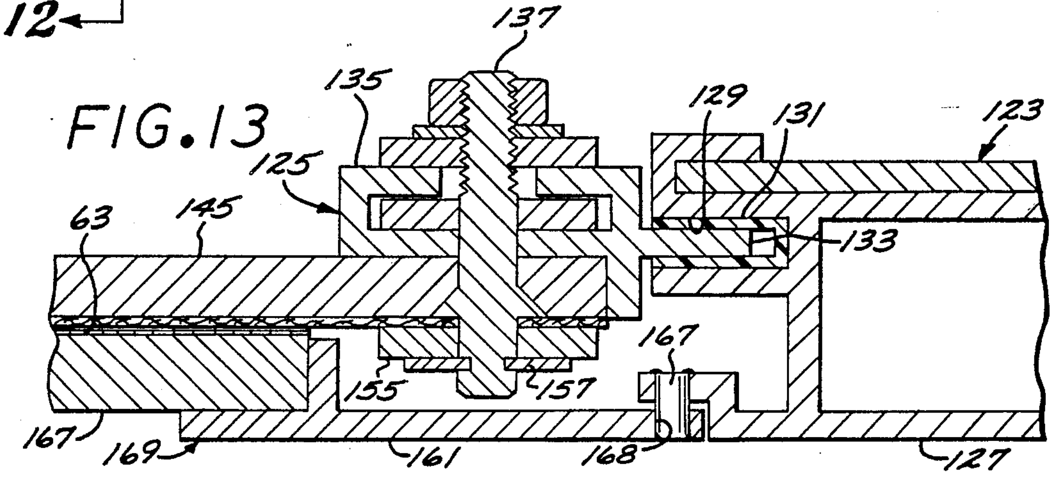
FIG. 13 is a horizontal sectional view, in enlarged scale, taken along the line 13—13 of FIG. 9.

The screen frame 125 is formed at spaced locations about its periphery with bores for receipt of mounting bolts 137 (FIG. 13). The bolts 137 are formed centrally along their shanks with respective conical centering flanges 139 which conveniently nest in conical countersunk bores 141 in a diffusion screen 145 to hold such diffusion screen securely against the frame 125. Overlying the diffusion screen 145 is the master screen 61. With continued reference to FIG. 13, it will be noted that the shanks of the registration bolts 137 project through bores 151 in the master screen 61 and that such master screen has at its margin overlying border strips 155 held in position by means of snap rings 157. Consequently, the mosaic transparency 61 may be rapidly and conveniently removed and replaced as described hereinafter.

Connected to the main frame 121 in any convenient manner is a screen frame, generally designated 169, which mounts a glazed diffusion screen 167. Conveniently, the grid of the display screen 63 is formed in the body of the diffusion screen 167 and, for clarity, is depicted diagrammatically in FIG. 13 on the surface thereof. It is important that registration of the respective transparency and screen frames 123 and 125 be closely held. To this end, the housing frame 123 mounts about the periphery thereof a plurality of index pins 170 which closely fit index bores 168 formed in the screen frame 169. It will be appreciated that, in practice, an adjustment may be provided for adjusting the location of the screen frame relative to the housing 123 to enable precision adjustment of the screen 63 relative to the transparency 61.

Figure 12:
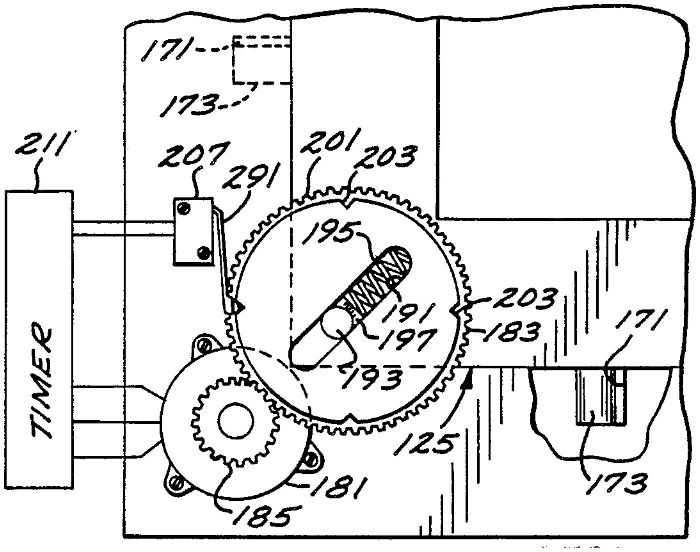
FIG. 12 is a vertical sectional view, in enlarged scale, along the line 12—12 of FIG. 10.

Referring to FIG. 12, shifting of the transparency frame 125 relative to the screen 63 may be achieved by any desirable linkage or drive mechanism which is adequate to maintain precise location to align the aperture 65 and window segment 62-68. In the preferred embodiment, for the purposes of illustration, the transparency frame 125 essentially floats within the main frame 123. The main frame is formed along its interior periphery with blind bores 171 which are precisely located and receive respective index pins 173 projecting from the window frame 125 to thus limit upward and downward travel, as well as travel to the right and left to 0.013 inches.

For the purposes of illustration, 115 volt synchronized drive motors 181 are shown mounted to the four corners of main frame 123 to drive respective switching gears 183 through pinions 185. Each switching gear 183 is formed centrally with a diametrical groove 191 which receives a driven pin 193 projecting from the master screen frame 125. Received in the groove 191 is a compression coil spring 195 which abuts on one end against the end of the groove and abuts a rider 197 at its opposite end to push against the periphery of the pin 193. The gear 183 is formed with a stepped diameter which forms a circular cam surface 201 having V-shaped timing notches 103 spaced 90 degrees thereabout. An indexing microswitch 207 is mounted on the main frame 123 and has its follower arm 209 formed with a follower riding on the cam surface 201 and selectively received in the timing notches 203. A solid state timer 211 is coupled between the timing switch 207 and motor 181 to control such motor.

Figure 9:
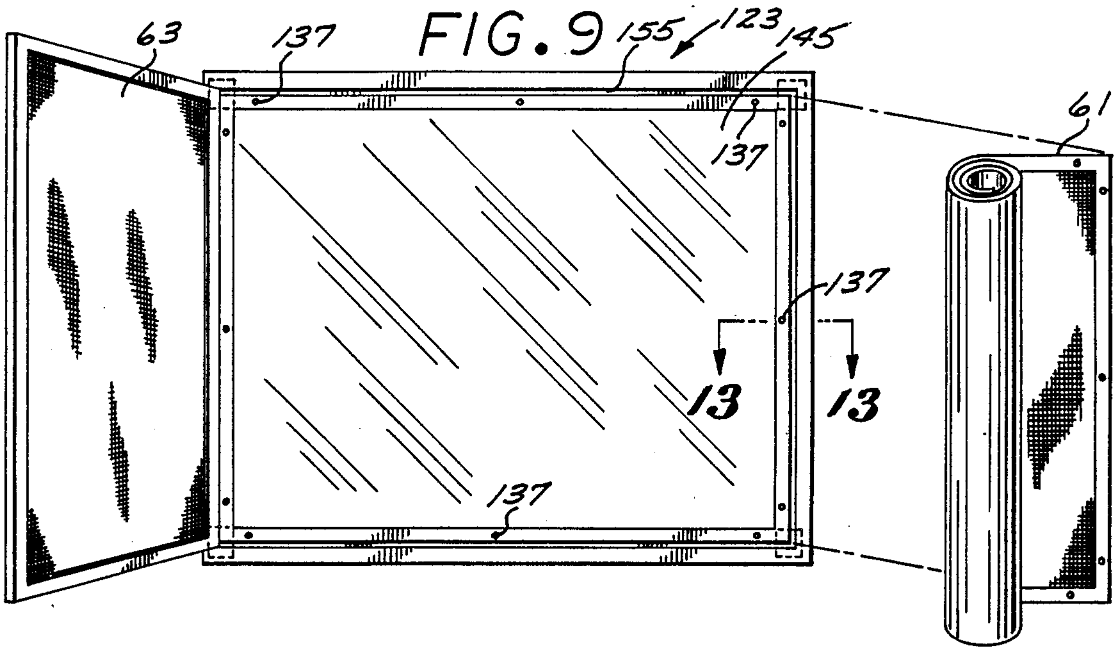
FIG. 9 is a front perspective view of a display housing embodying the apparatus of the present invention.

In operation, the individual transparencies 37, 53, 55, and 57 may be made up from any desired copy, such as the copy of four different advertisers or animated advertising copy of a single advertiser. Because of the ease and convenience of making the transparencies, the copy 25 itself may be that copy which has been conventionally used by the advertiser in many different medias, such as magazines and other publications. Once the transparencies 37, 53, 55 and 57 have been married together and the mosaic transparency 61 prepared therefrom, that transparency may be placed on a master jig (not shown) and indexing holes 151 (FIG. 9) formed therein in precise locations corresponding with the locations of the registration bolts 137 in the frame 125 (FIGS. 9 and 13).

Figure 10:
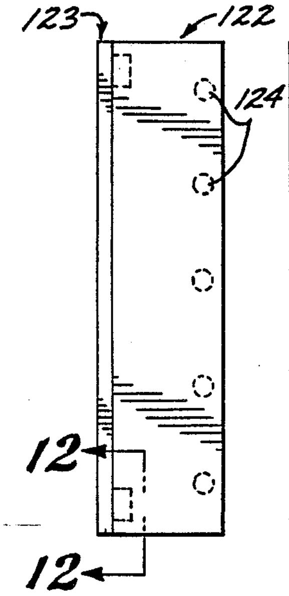
FIG. 10 is a righthand end view of the apparatus of FIG. 9 mounted in a light box.
Figure 11:
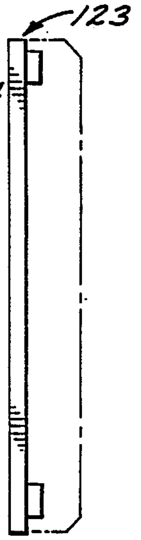
FIG. 11 is a righthand end view of the apparatus shown in FIG. 9.

The housing frames 123 themselves may be formed as individual frames shown in FIG. 11 for backlighting in any manner and may be mounted on the front of a light box 122 which is back lighted by fluorescent lights 124 as shown in FIG. 10. In either event, the transparency 61 may be conveniently rolled up and mailed or air couriered to the location where the mounting frames 121 are located. The previous copy may be easily replaced with the new copy by the technician merely removing the snap clips 157 (FIG. 14), the border strips 155, old copy and replacing it with the new copy. Display of the new advertising may then be conveniently commenced by merely energizing the motors 181 causing the gears 183 to rotate at a predetermined speed. The eccentrically mounted gears drive the pins 193, for instance, first upward from the position shown in FIG. 13 to stop as dictated by the distance the indexing pin 173 located on the side may travel in the bore 171 to then dwell for a predetermined period of time, such as 30 seconds, and then to rotate again through another 90 degrees to carry the screen frame 125 and consequently the screen 61 to the left 0.023 inches corresponding with the distance the top and bottom indexing pin 173 can travel in its receiving slot 171.

This procedure is continued throughout the remainder of the cycle thus causing the transparency 61 to be carried about a tiny square loop behind the screen 63 to shift the apertures 65 through the four positions shown in FIGS. 5, 6, 7 and 8, thus sequentially exposing the groups of window elements 62, 64, 66 and 68 while sequentially screening out light from the three patterns not being displayed. The display will then continue to cycle repeatedly displaying the individual patterns 71, 73, 75 and 77 (FIG. 2). It will be appreciated that in practice, these patterns will actually be in the form of individual advertisements which may be the advertisements for four different products.

On the other hand, in many instances it is desirable for an advertiser to display advertisements perceived by the viewer as being animated. In those instances, the four different patterns 71, 73, 75 and 77 may be replaced by patterns of copy from a single advertiser. By constructing those patterns of individual advertising copy which, when viewed sequentially in the projected form of the present invention, give the viewer the perception of the advertisements actually moving. It has been demonstrated, in fact, that with the present invention, reproduction of an advertisement of a soft drink in the four different individual transparencies with water drops depicted at slightly different elevations on the side of the glass, when viewed sequentially through the apertures display screen of the present invention gives the viewer the impression of the water drops travelling down the side of the glass much as seen in real life.

With the relatively small size of 0.013 inches per side for the square pixels defining the window elements 62, 64, 66 and 68 disclosed in the preferred embodiment, it has been demonstrated that the master screen, only being shifted 0.013 inches relative to the display screen, affords rapid changing from one display pattern to the next. This small movement is imperceivable to the human eye from a distance of about ten feet much akin to the changing pattern on the screen of the cathode ray tube in a television set. This effect is achieved in a relatively inexpensive mechanical fashion which provides the advantage of employing mosaic transparencies which are relatively inexpensive to produce on a mass basis such that display advertising may be relatively easily prepared for distribution to numerous different retail outlets located in the many different retail markets of the country. The apparatus shown in the preferred embodiment is contemplated for relatively small applications, on the order of 16"×20" to be reviewed from relatively close proximity. The display apparatus, being relatively thin and self-contained may easily be mounted on the face of pre-existing light boxes to thus take advantage of stationary display devices already in use.

For other applications, such as large billboards used in the plaza area of shopping malls and typically located some 25 or more feet from the viewer, it is contemplated that the size of the cells defining the size of the window elements of the mosaic transparency will be proportionately larger without detracting from the overall effect on the viewer.

From the foregoing it will be appreciated that the method and apparatus of the present invention provides an economical and convenient means for preparation of a display from multiple copies and subsequent sequential display thereof from a single display mechanism. The resolution of the display itself is such that the naked eye of the viewer cannot detect the fact that approximately 75% of the mosaic transparency is being masked out by the grid work of the display screen but, rather, perceives the individual projected displays as being separate, independent visually pleasing displays.

We claim:

1. A display system having a single-frame transparency which contains up to four independent images, each of said images having spaced apart groups of pixels interlaced with groups of pixels of the other of said images, each of said images being selectable for projection by a movable grid mask, comprising:

a housing having a light source;

said single-frame transparency coupled to said housing wherein each of said images is defined by a plurality of spaced apart square shaped groups of pixels, respective groups of pixels for each of said images being juxtaposed in a square mosaic pattern;

said grid mask coupled to said housing in overlaying relation with said single-frame transparency, said grid mask being defined by a plurality of vertical and horizontal opaque grid lines in spaced relation to form a plurality of square shaped transparent apertures for alignment with one of said groups of pixels defining one of said images; and, drive means coupled to said housing for displacing said grid mask relative to said single-frame transparency in equal increments to form a closed loop defining a square pattern to sequentially align said grid mask apertures with respective groups of pixels for each of said images to permit light from said light source to project therethrough, whereby each individual image is displayed sequentially.

2. The display system as recited in claim 1 wherein each of said square shaped groups of pixels have sides measuring 0.013 inches.

3. A display system having a single-frame transparency which contains up to four independent images, each of said images having spaced apart groups of pixels interlaced with groups of pixels of the other of said images, each of said images being selectable for projection by a movable grid mask, comprising:

a housing;

a transparency film frame mounted on said housing and configured for projection of light therethrough from a back side thereof;

a screen frame mounted on said housing;

said single-frame transparency mounted in said transparency film frame, said interlaced groups of pixels defining a mosaic wherein each of said images is divided into a plurality of square shaped groups of pixels of predetermined width, said groups of pixels for each of said images being displaced each from the other a distance equal to said predetermined width and respective groups from each of said images being disposed in juxtaposition with one another in equal increments in two orthogonal directions;

said grid mask mounted in said screen frame and in overlaying relationship with said transparency, said grid mask being defined by a plurality of opaque grid lines having a width dimension equal to said predetermined width of said pixel groups and forming a plurality of square apertures for displaying the pixel groups of one of said images responsive to a positional location of said grid mask with respect to said transparency;

index means interposed between said frames for limiting and guiding relative movement therebetween; and, drive means coupled to said housing for shifting said screen frame in equal increments to form a closed loop defining a square pattern relative to said transparency film frame for sequentially aligning said grid mask apertures with respective pixel groups for each of said images, whereby light is permitted to be sequentially projected through said pixel groups overlaid by said apertures for sequentially displaying each of said images.

4. The display system as recited in claim 3 wherein said predetermined width is 0.013 inches.

5. The display system as recited in claim 3 wherein:

said housing is formed with a peripheral frame having an inwardly opening groove;

said transparency film frame is formed with a peripheral outwardly projecting tongue received in said groove; and, said drive means adapted to move said transparency film frame relative to said housing and said screen frame.

6. The display system as recited in claim 3 wherein:

said single-frame transparency is formed with registration elements; and said transparency film frame is formed with registration means engageable with said registration elements for locating said single-frame transparency relative to said transparency frame.

7. The display system as recited in claim 3 wherein said housing includes guide means for guiding said screen frame in said square pattern relative to said transparency film frame.

8. The display system as recited in claim 3 wherein said system further includes registration means interposed between said screen frame and said housing for locating said transparency film frame relative to said housing.

9. A method of preparing and displaying up to four images from a single-frame transparency, each of said images having spaced apart groups of pixels interlaced with groups of pixels of the other of said images, each of said images being selectable for projection from a back lighted box by a movable grid mask having square grid apertures, the method comprising the steps of:

a. forming an individual transparency for each of said images from respective copy patterns wherein pixels representing said copy pattern are divided into spaced apart square shaped groups, said groups forming a square matrix of translucent optic segments defining a first portion of said transparency, said transparency having a second portion between said optic segments defining transparent group apertures;

b. stacking each of said individual transparencies one upon the other with the optic segments of each transparency offset from the optic segments of the other transparencies and in registered alignment with said group apertures of each said other transparencies to form an interlaced pattern of said optic segments;

c. reproducing said interlaced pattern of said optic segments to form a mosaic transparency;

d. mounting said mosaic transparency to said back lighted box for projection of light therethrough;

e. overlaying said mosaic transparency with said grid mask wherein said grid apertures are in registered alignment with the optic segments representing one of said images and blocking said projection of light through said other of said optic segments representing said other of said images; and, f. sequentially displacing said grid mask in equal increments to form a closed loop defining a square pattern to sequentially register said grid apertures with said optic segments representing each of the other of said images.

10. The method as recited in claim 9 wherein the step of forming an individual transparency includes for a color copy pattern the step of:

photographically forming said individual transparency with computer means coupled to camera means operative to sense and store a first signal corresponding with a coloration of said color copy pattern, storing a screening signal representative of the collective light when projected from collective grid apertures of a grid mask, and to compare said first signal and screening signal, said camera means being responsive to said enhancement signal to produce a photograph of said copy pattern having enhanced coloration.

* * * * *